Jan. 19, 1971   J. P. STINE   3,555,788
MOBILE FRUIT HARVESTER

Filed July 7, 1967   16 Sheets-Sheet 1

INVENTOR
JOSEPH P. STINE
BY
Mason, Mason & Albright
ATTORNEYS

Jan. 19, 1971 J. P. STINE 3,555,788
MOBILE FRUIT HARVESTER
Filed July 7, 1967 16 Sheets-Sheet 6

INVENTOR
JOSEPH P. STINE
BY
Mason, Mason & Albright
ATTORNEYS

Jan. 19, 1971 J. P. STINE 3,555,788
MOBILE FRUIT HARVESTER
Filed July 7, 1967 16 Sheets-Sheet 7

INVENTOR
JOSEPH P. STINE
BY
Mason, Mason & Albright
ATTORNEYS

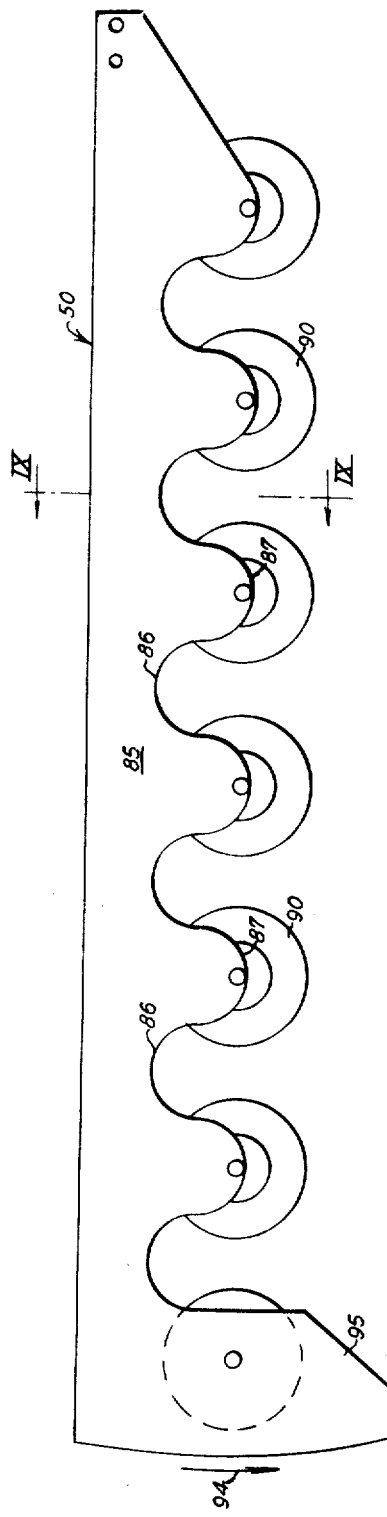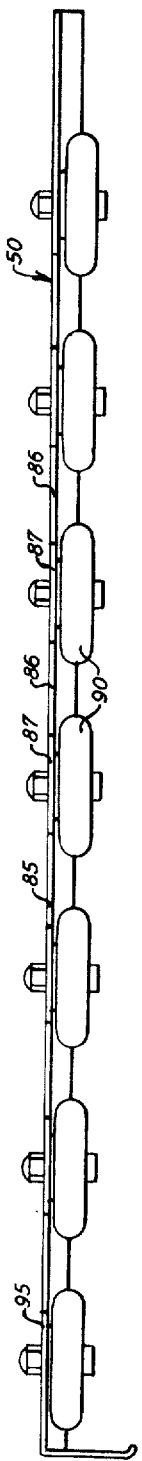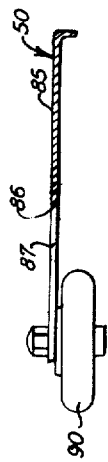

Jan. 19, 1971 J. P. STINE 3,555,788
MOBILE FRUIT HARVESTER

Filed July 7, 1967 16 Sheets-Sheet 9

INVENTOR
JOSEPH P. STINE
BY
Mason, Mason & Albright
ATTORNEYS

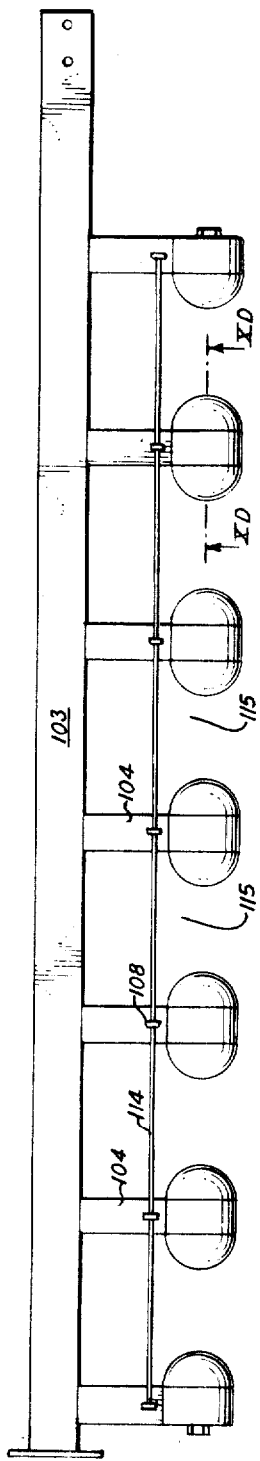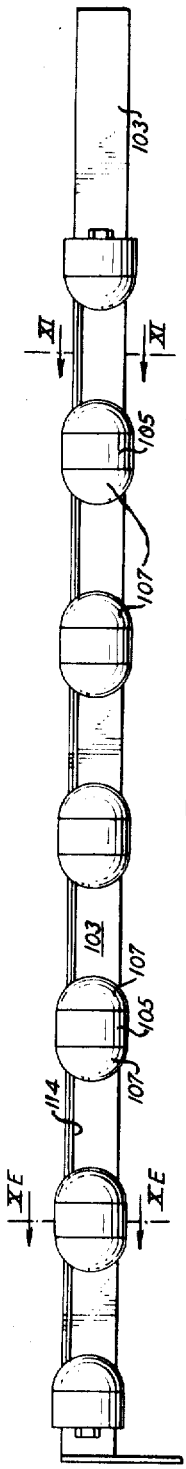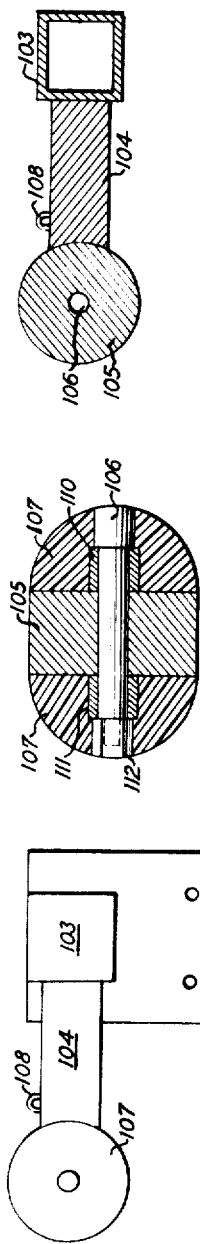

Jan. 19, 1971 J. P. STINE 3,555,788
MOBILE FRUIT HARVESTER
Filed July 7, 1967 16 Sheets-Sheet 11
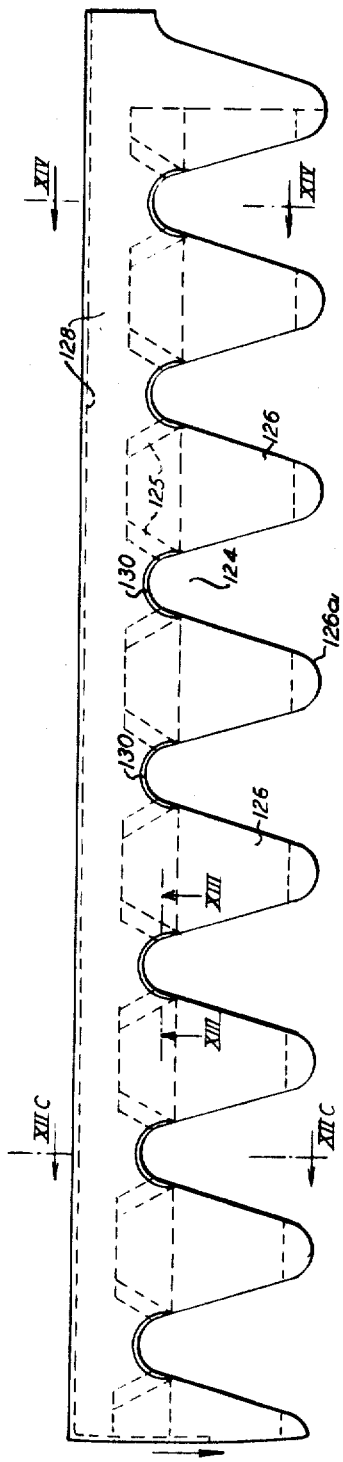
FIG. 12B
FIG. 12A
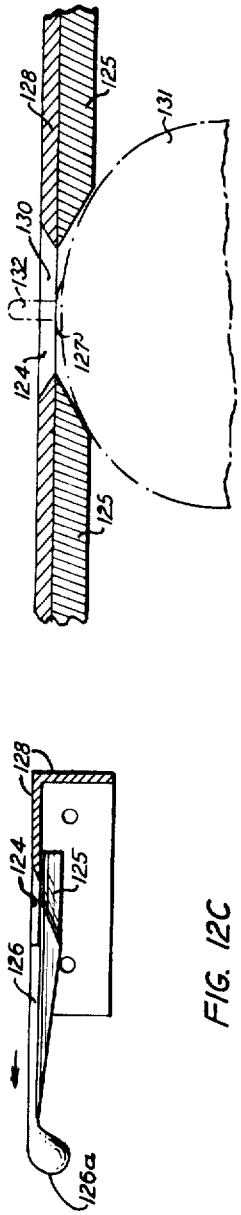
FIG. 13
FIG. 12C
INVENTOR
JOSEPH P. STINE
BY
Mason, Mason & Albright
ATTORNEYS INVENTOR
JOSEPH P. STINE
BY
Mason, Mason & Albright
ATTORNEYS

FRUIT FORCE DIAGRAM

STEM STRESS GRAPH

Jan. 19, 1971 J. P. STINE 3,555,788
MOBILE FRUIT HARVESTER
Filed July 7, 1967 16 Sheets-Sheet 14
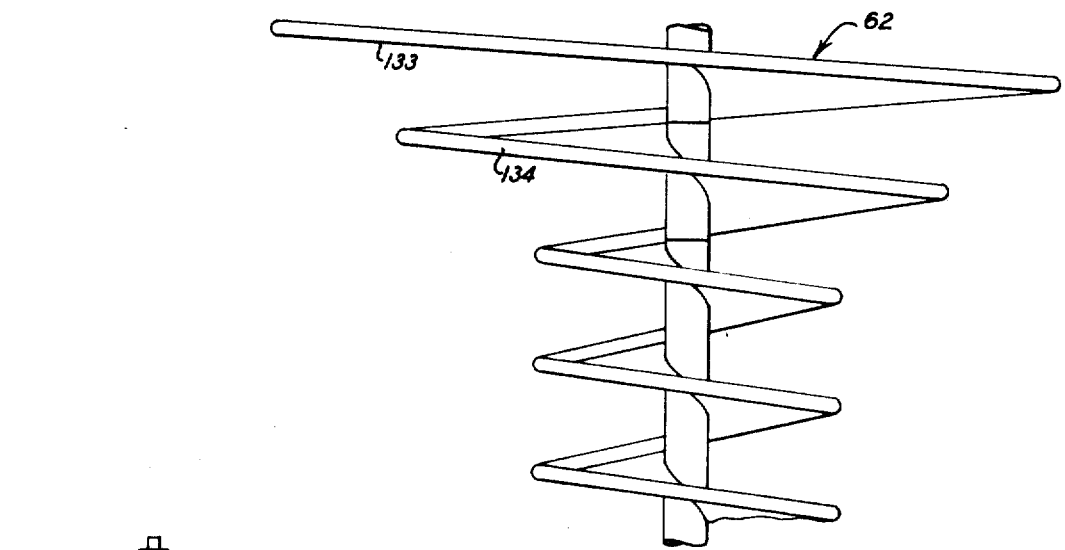
FIG. 17
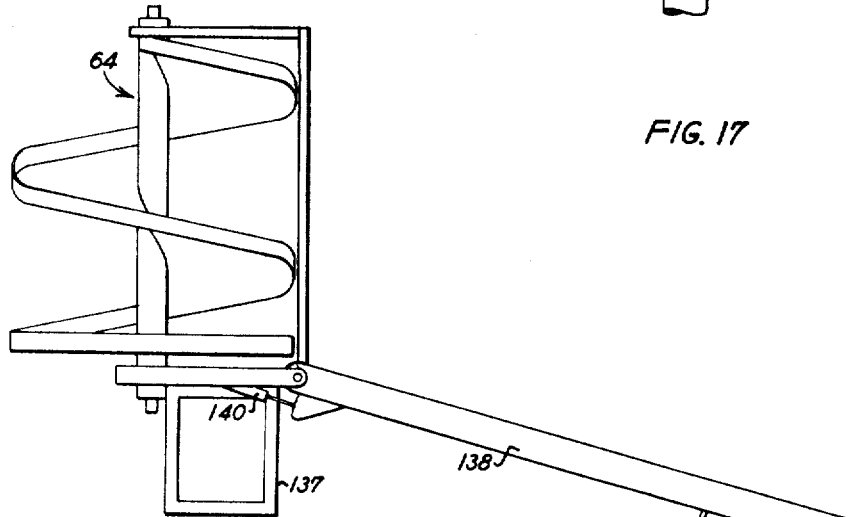
FIG. 18
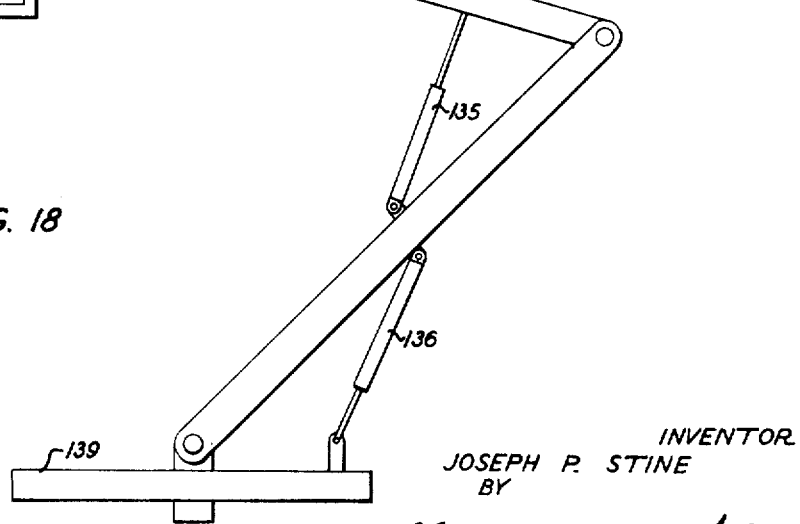
INVENTOR.
JOSEPH P. STINE
BY
Mason, Mason & Albright
ATTORNEYS Jan. 19, 1971  J. P. STINE  3,555,788
MOBILE FRUIT HARVESTER Filed July 7, 1967  16 Sheets-Sheet 15

INVENTOR
JOSEPH P. STINE
BY
Mason, Mason & Albright
ATTORNEYS

Jan. 19, 1971 J. P. STINE 3,555,788
MOBILE FRUIT HARVESTER
Filed July 7, 1967 16 Sheets-Sheet 16

INVENTOR
JOSEPH P. STINE
BY
Mason, Mason & Albright
ATTORNEY.

United States Patent Office 3,555,788
Patented Jan. 19, 1971

3,555,788
MOBILE FRUIT HARVESTER
Joseph P. Stine, P.O. Box 2513, Orlando, Fla. 32802
Filed July 7, 1967, Ser. No. 651,792
Int. Cl. A01g 19/00
U.S. Cl. 56—328
31 Claims

ABSTRACT OF THE DISCLOSURE

A mobile fruit harvester with a spiral or similarly shaped structure having a plurality of fruit picking devices which are rotated about a vertical axis adjacent an orange tree or other fruit bearing plant, whereby the fruit is removed from the tree at various levels and rolls down the spiral structure under the picking devices to a place where it is discharged into a receptacle. The fruit picking device includes a substantially horizontal piece extending from the periphery of the spiral structure inwardly. The piece has a plurality of slots to receive the stems of oranges and surfaces are provided on both sides under each slot to hold the orange when, due to movement of the device, the orange is separated from its stem by the stem being pulled at its calyx against the end of the slot or other obstruction in the slot which acts as a fulcrum for this purpose and disposes the calyx as the most likely area along the stem for separation to take place.

BACKGROUND OF THE INVENTION

This invention relates generally to methods and apparatus for harvesting fruit, particularly oranges and the like which tend to grow in the canopy portions of a tree.

Present practices for mechanical harvesting of fruit, particularly citrus fruits, have not proved entirely satisfactory. Certain devices utilize mechanical fingers which comb through the limbs of the trees and pull fruit from the stems. This causes considerable plugging and stem breaking. Another method suggested the use of spindles which facilitates branch passage and causes the fruit to be twisted about its axis. But such twisting will sometimes cause the stem to break at a point above the calyx, leaving a short piece of stem attached to the fruit. Various types of tree shakers are sometimes employed to induce a violent tree action whereby the fruit is dislodged from the tree and falls to the ground or into a collector of one type or another. The difficulty with this method is that some leaves and small fruit are also removed, particularly during the late season. Additionally, the fruit, when so dislodged, is sometimes propelled a considerable distance beyond the tree. High velocity air blasts have also been used to blow fruit from trees, but this also has presented certain problems of fruit collection and results in leaf damage. Mechanical pickers have been used to pick fruit one at a time, but the slow speed of the apparatus is a distinct disadvantage from a cost standpoint. Most of the above described pickers require changing from one stationary position to another for successive picking operations.

A need exists in the fruit harvesting industry for apparatus and methods which are economical to apply, which will effect rapid picking of a high percentage of the ripe fruit on the trees, and which do not injure to any significant degree the picked fruit, the limbs, new small fruit on the tree, or the leaves.

SUMMARY OF THE INVENTION

The principal object of this invention is to provide a mobile fruit harvester with a continuous forward motion which is adapted to compensate for irregular shaped trees having limbs which may not be uniform in arrangement and size, and present a random pattern of fruit growth. The invention presents a picking attachment which moves along the tree canopy so that a high percentage of the fruit is picked. The apparatus according to the invention also collects and conveys the fruit for temporary storage in a fruit bin carried on the harvester. Interaction between the apparatus and the tree is such as to minimize damage to the tree, its leaves, or new fruit.

A further object of the invention lies in the picking attachment which organizes the random pattern of fruit growth, holds individual fruit members rigid in a relative sense for picking, and transforms the pulling force on the stem to a stress which will result in a tensile failure at the calyx. By inducing a failure at this point, plugging and stem breakage is reduced. The picking attachment is so designed as to discriminate between small, new fruit and mature fruit.

Further objects, adaptabilities and capabilities will appear as the description progresses, reference being had to the accompanying drawings, in which:

BRIEF DESCRIPTION OF THE DRAWINGS

FIG. 8A is a front elevational view of a picking attachment in accordance with the invention;

FIG. 8B is a top view of the attachment shown in FIG. 8A;

FIG. 8C is a side view of the attachment shown in FIG. 8A;

FIG. 10A is a front view of a further embodiment of the fruit picking attachment of the invention;

FIG. 10B is a top view of the attachment shown in FIG. 10A;

FIG. 10C is a side view of the attachment shown in FIG. 10A;

FIG. 10D is a sectional view taken on lines XD—XD of FIG. 10B;

FIG. 10E is a sectional view taken on lines XE—XE of FIG. 10A;

FIG. 12A is a front view of a still further picking attachment in accordance with the invention;

FIG. 12B is a top view of the attachment shown in FIG. 12A;

FIG. 12C is a side view of the attachment shown in FIG. 12A;

FIG. 13 is a sectional view taken on lines XIII—XIII of FIG. 12B;

FIG. 17 illustrates a rotor in accordance with the invention which is modified to the contour of the tree;

FIG. 18 illustrates a modification of the invention for a mobile fruit harvester rotor mounted on a boom which is in turn mounted on a truck (not shown);

DESCRIPTION OF THE PREFERRED EMBODIMENTS

The invention broadly relates to a mobile platform which is self-propelled or towed or carried by a vehicle, on which is mounted a rotatable vertical helix spiral rotor having a sufficient radius, say 6 to 9 feet, to engage the canopy of a fruit tree. The continuing upward movement of the flights of the rotating helix spiral rotor with respect to any point of the tree canopy urges the limbs at various elevations to move into the interior of the rotor where the tree's fruit is detached therefrom by the picking attachments. Variations in the size or shape of the limbs or the placement of the fruit thereon is overcome by the continually changing height of the helix spiral flights. When a fruit member is detached from the tree, it drops a minimal distance from the picking attachment to the underlying rotor flight and rolls down the helix spiral to a catch basin located at the bottom of the spiral. From the catch basin the fruit is transported to a temporary storage bin where it is stored until the fruit is transferred to a service truck or transported by other means from the field.

The picking attachment is designed to bring each individual fruit member into a position wherein its axis is approximately perpendicular to the plane of the picking attachment. Rotation and forward motion of the rotor to which the picking attachment is affixed places the stem of the fruit member in tension whereby the fruit member exerts a force on the picking attachment. The picking attachment is so designed that a reactive force perpendicular to the fruit member's axis is created at the calyx, which causes a separation of the fruit from the stem generally in the area of the calyx. The force required to separate the stem from the fruit in this fashion is less than required when the stem is pulled directly. There is also a reduction of plugging and stem breakage. The picking attachment is designed so as to discriminate between small fruit, including the small fruit of the next year's crop, and ripe, whole sized fruit, leaving the small fruit unharmed on the tree.

Figure 1:
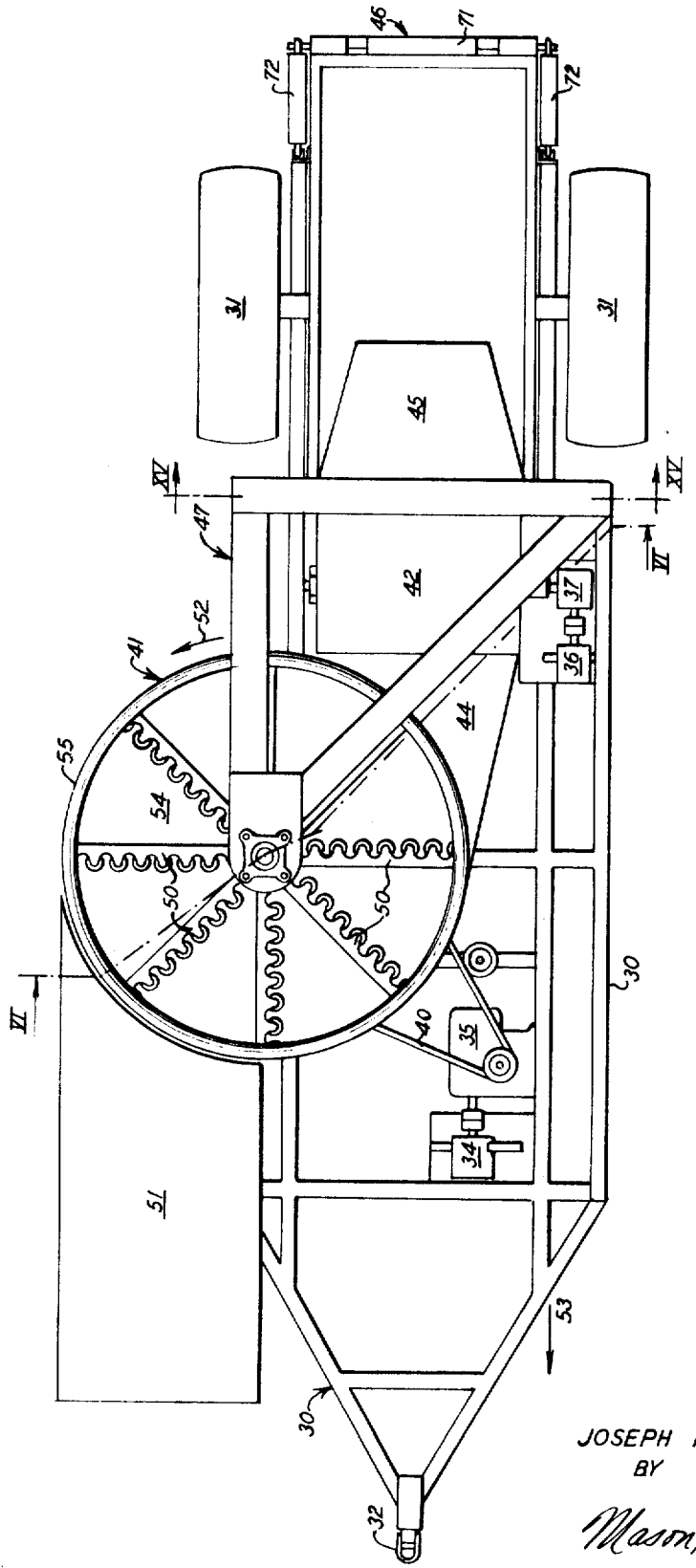
FIG. 1 is a top view of the mobile fruit harvester of the invention.
Figure 2:
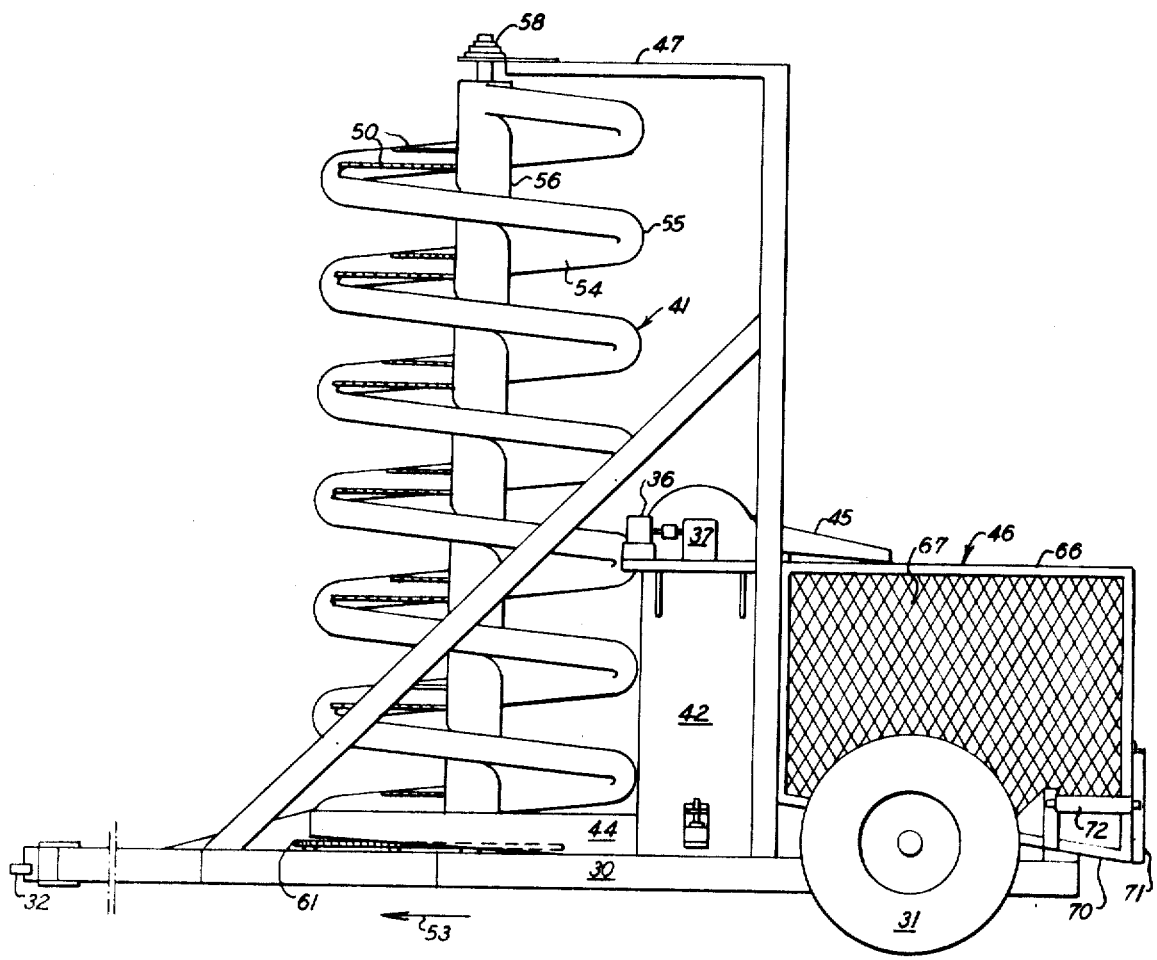
FIG. 2 is a left side elevational view of the mobile fruit harvester.

Referring now to FIG. 1, the main frame 30 is composed of structural steel and comprises the chassis of the trailer. The rear wheels 31 may be steerable, the specific mechanisms are not shown since they are unnecessary for an understanding and use of the invention by persons skilled in the art. The unit shown in the figure is provided with a tractor hitch 32 for connection to a tractor or other pulling vehicle. While the forward speed of the unit is variable, it will be understood that the speed will generally be less than 100 feet per minute. The power supply for the unit shown in the figure will be from a tractor power takeoff or from a power unit mounted upon the trailer. While any conventional and generally widely known power conveyance system may be employed, a hydraulic system is preferred. Whatever power system is utilized activates the rotor motor 34 and the elevator motor 36. The motor 34 drives the rotor member 41 through a power train which includes the worm gear speed reducer 35, the roller chain 40 and the driven sprocket 61. The motor 36, connected through the worm gear speed reducer 37, powers an elevator 42 which transports fruit from the catch basin 44 through the discharge chute 45 to the fruit bin 46. The rotor 41 is held in a vertical position by a top brace 47 which is affixed to the frame 30. Picking attachments 50 extend radially outwardly from the axis of the rotor 41. A limb pickup ramp 51 is attached to the frame 30 on the lower edge to guide low lying limbs into the path of the rotor 41. The arrow 52 indicates the direction of normal rotation of the rotor 41 and the arrow 53 indicates the direction of travel of the harvester.

With reference to FIGS. 2 through 6, it will be understood that the helix spiral rotor 41 is constructed of sheet metal material cut into circular sheets, between 6 and 9 feet in diameter, with a concentric hole and a radial cut. These sheets are rolled into a helix spiral flight having a pitch of approximately two feet and are connected together to form the bottom portions 54 of the flights of the rotor 41. The periphery of the rotor is formed by a spiral pipe 55 which is of a diameter somewhat larger than that of the maximum size to be encountered in the fruit being picked so there is sufficient room for the fruit to roll under the picking attachments 50 along the bottom portions 54 of the rotor 41. As noted, the pitch of the helix spiral rotor 41 is approximately 2 feet and the bottom portions 54 are welded or otherwise secured to a center pipe 56 and the spiral pipe 55 for rigidity and support. The center pipe 56 has a shaft welded in each of its ends to fit into a thrust bearing 57 at its bottom and a support bearing 58 at the top of the device. The bottom thrust bearing 57 is bolted or otherwise affixed to the main frame 30 and the top support bearing 58 is similarly secured to the top brace 47.

As noted before, the rotor 41 is driven by motor 34 with a speed reducer 35 and roller chain 40 or by other means suitable for the purpose. A large driven sprocket 61 is affixed to the lower shaft of the rotor 41 above the thrust bearing 57. While the speed of the rotor 41 is variable, preferably it should operate at approximately ten revolutions per minute. It will be noted from the figures that the rotor 41 has a left hand screw and moves counterclockwise when viewed from the top so that when it passes through the canopy of the tree a lifting action takes place. The rotor 41 is preferably about tree high and, as previously noted, approximately 6 to 9 feet in diameter so that it is capable of penetrating 2 to 4 feet of the tree canopy without interference from the center pipe 56. If desired, however, the diameter of the rotor member may be increased in its upper aspect to conform to the shape of the tree, as illustrated by rotor member 62 shown in FIG. 17. Also, if desired, a shorter rotor member 64, as shown in FIG. 18 which is vertically adjustable with reference to the ground, may be employed.

Figure 7:
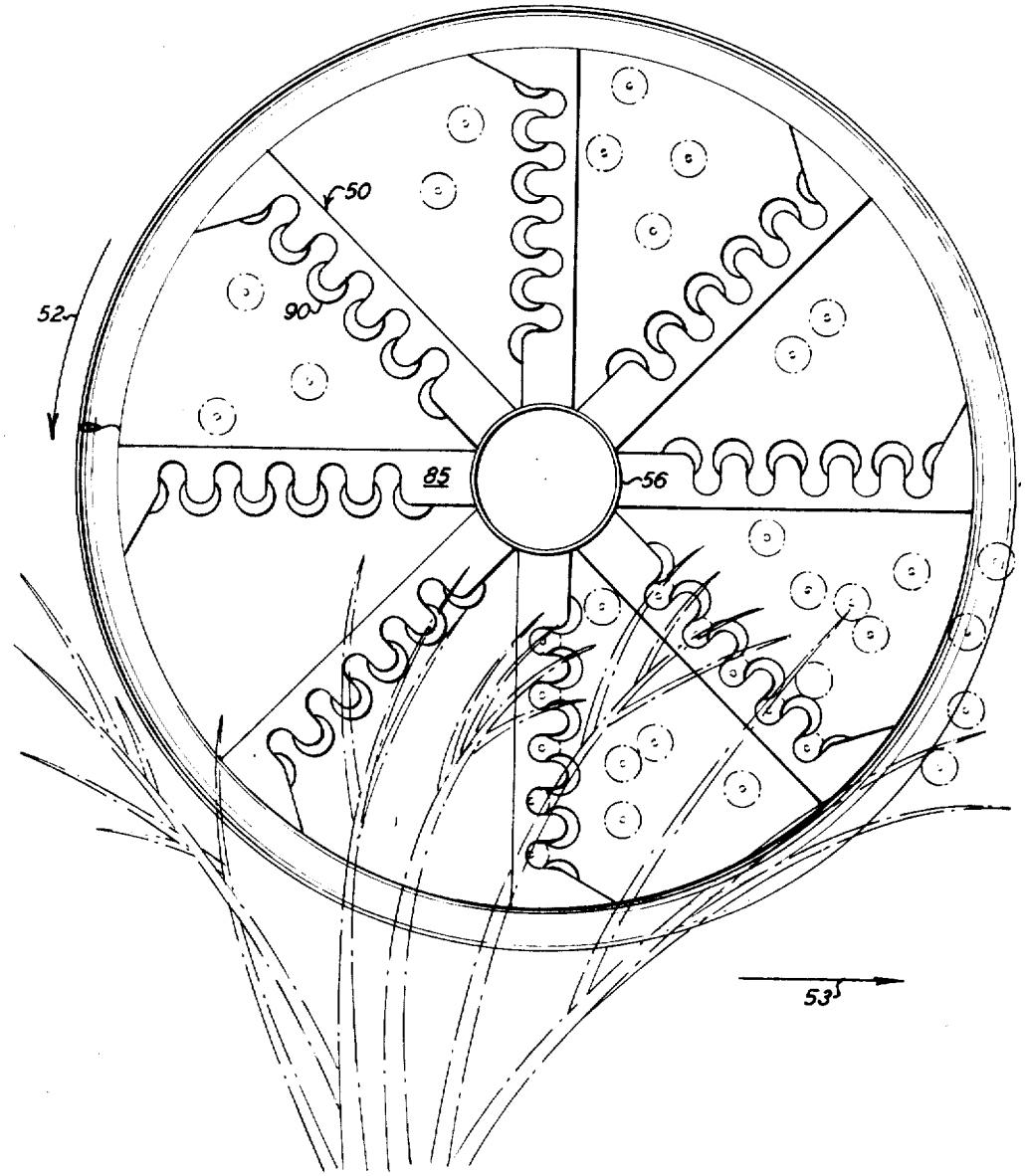
FIG. 7 is a top view of the spiral structure of the invention illustrating its rotation through the canopy of a tree.

From FIG. 7, it will be appreciated that the forward motion of the rotor 41 causes the limbs and fruit to be received in the open spaces between the flights of rotor 41. In the event a limb is obstructed by the spiral pipe 55, the rotation of the rotor member 41 moves the spiral pipe 55 out of the way so that an open portion between the flights is presented and the limb comes into a position where-by its fruit is available to the picking attachments 50. After the individual fruit members are separated from their stem, the inclined plane comprising portions 54 of the rotor 41 allows the fruit members to descend in orderly fashion to the catch basin 44 at the bottom. The spiral pipe 55 acts as the retaining rim to prevent the fruit from spilling out of the rotor 41 during their descent.

The limb pickup ramp 51 is made of sheet metal or other suitable material and is affixed to the main frame 30. It will be noted from the drawings, that the pickup ramp 51 includes an inclined portion to ease the low lying limbs and fruit into the first flight of the rotor 41, where they are subjected to the actions of the picking attachments 50.

The catch basin 44 surrounds the bottom of the rotor member 41 to receive the fruit as it discharges from the floor of the bottom flight portion 54. The floor of catch basin 44 descends to the rear so that the fruit is conveyed by gravity to the elevator 42. Catch basin 44 is of sufficient size to allow for an accumulation of fruit when the elevator 42 is overloaded.

The elevator 42 is conventional in design and includes buckets 65 which convey the fruit to a height above the temporary storage fruit bin 46 and discharge the fruit therein through the discharge chute 45. Power for the elevator 42 is supplied by a motor 36 through a worm gear speed reducer 37 to give the elevator the correct speed to handle the anticipated maximum volume of fruit from the catch basin 44 without injury.

Figure 15:
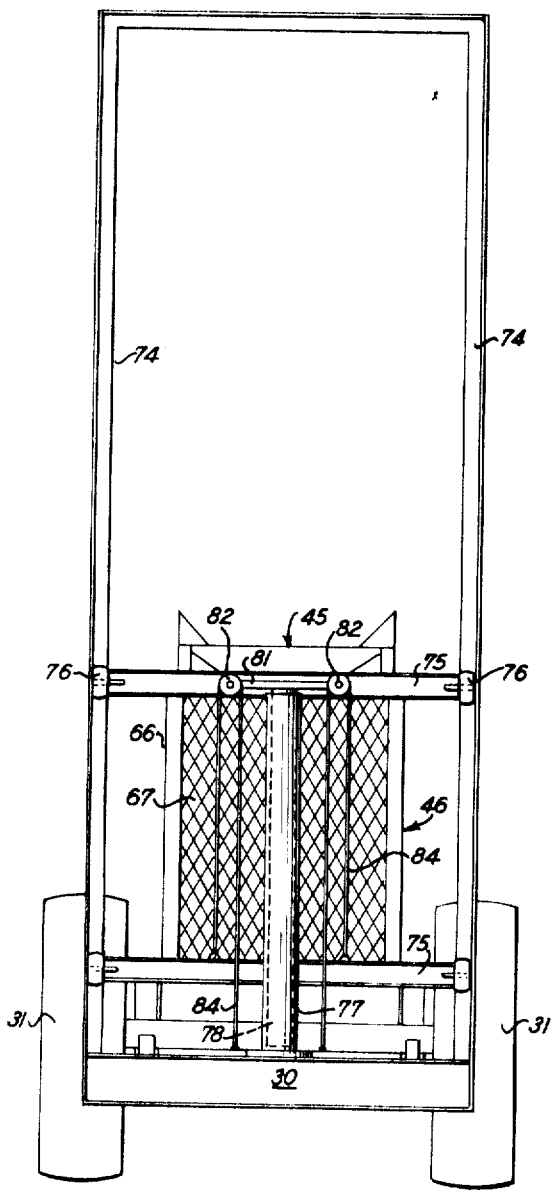
FIG. 15 is a cross sectional view taken on lines XV—XV of FIG. 1.

The fruit bin 46 is designed to hold approximately 70 cubic feet (or 2 tons) of fruit. It is constructed of an angle iron frame 66 with expanded metal sides 67. Its floor 70 is sloped so that fruit may escape through the dump gate 71 when it is opened by means of hydraulic cylinders 72. The fruit bin 46 is supported by the lift track 74 which comprises a part of the main frame 30. From FIG. 15, it will be noted that the fruit bin 46 is connected to a pair of cross bars 75 having track wheels 76 rotatably received in the ends thereof, which roll in the lift track 74, such track being preferably U-shaped so as to eliminate all but vertical movement of the track wheels 76. A single acting hydraulic cylinder 77 which is affixed to the frame 30 receives a piston 78 with a head plate 81 affixed to its upper end. The head plate 81 carries a pair of sprockets 82 over which roller chains 84 are received. One end of each roller chain 84 is secured to the frame 30 and the other end is secured to the lower crossbar 75.

When it is desired to discharge fruit from the bin 46 into a truck or other conveyance, such conveyance is appropriately positioned in the vicinity of the fruit bin 46. Hydraulic fluid is admitted into the cylinder 77 under the piston 78 by means which are conventional and generally widely known by those skilled in the art whereby the piston 78, together with the crossbar 75 and the fruit bin 46 are lifted until it reaches a height over the loading area of the conveyance (or the conveyance is at this time moved to place its loading space under the dump gate 71 of the fruit bin 46). Hydraulic cylinders 72 are then actuated to open the dump gate 71, and fruit in the fruit bin 46 transfers by gravity into the storage space of the proximate conveyance. When the unloading of the fruit bin 46 has been completed, it is lowered by releasing the pressure under the piston 78. During the picking operation, the fruit bin 46 is kept at its lowest position, so that fruit from the elevator buckets 65 is received in the discharge chute 45 and in order to maintain the center of gravity of the device as low as possible.

FIGS. 8A, 8B, 8C and 9 disclose a horizontal picking attachment such as attachment 50 which comprises a flat metal reinforced supporting member 85. The forward portion of the supporting member 85 is undulated to present a series of rounded slots 86 which, for the purposes of picking oranges, have radii of approximately three quarters of an inch. Rounded protrusions 87 of approximately the same radii mount a plurality of rubber rollers 90, which are rotatably received on axles 91 which, in turn, are secured to protrusions 87 by self-locking nuts 92. In operation, the picker travels in the direction indicated by the arrow 94. From FIG. 1, it will be understood that a plurality of pickers extend radially in a descending manner about the rotor 41. A guard portion 95 of the supporting member 85 extends farthest into the tree canopy. As the picker attachment 50 swings around, it encounters limbs, leaves, small fruit not yet ripe for picking, and the mature fruit. The leaves and small fruit are, in effect, brushed aside by the picker or pulled through slots 86, and unless the stems thereof are in a weakened condition, they are not normally dislodged. Limbs and branches are swept in an upward direction by portions 54. The chance of a limb or branch being caught within the slot 86 so as to be broken is minimal. However, fruit such as the orange 96, illustrated in FIG. 9, stands a good chance to pass between a pair of rollers 90 into the slot 86 in one of the several attachments 50 which will rotate in its vicinity during the pass of the rotor 41. As may be seen, the orange 96 caught in a slot 86 is pulled by its stem 97 to a position where the stem is pulled against a biased separation portion 100 of slot 86, and the fruit is in contact with portions 101 of the adjacent rubber rollers 90. The stem at the calyx 102 of the fruit bears directly against the separator portion 100. With the fruit 96 in such position the force components are so distributed between the stem 97, the separator portion 100, and the contact portion 101, that rupture and removal of the fruit at the calyx 102 is most probable, so that plugging or breaking at the stem per se is minimal.

FIGS. 10A–10E and 11 show a modification of the picking attachment 50 wherein the back support 103 is made of square tubing. At center distances of approximately 4 inches, fingers 104 are projected forward from the support 103. At the end of each of the fingers 104, steel discs 105, approximately 1½ inches in diameter, having the same thickness as the fingers 104, are welded thereto. Semi-spherical resilient rollers 107 are carried on each side of the discs 105. The free turning rollers 107 are attached to the disc 105 by the shoulder screw axles 106 passing through a bronze bushing 110 carried in roller 107, through the center hole in the disc 105, and through a further bronze bushing 111 of the opposite roller 107. The rollers 107 are countersunk to permit the head of the shoulder screw axle 106 and a nut 112 to be recessed into the rollers 107, thus streamlining the configuration. A strand of wire 114, which may be .080 music wire, comprises the separator of this embodiment. The wire 114 is connected to the fingers 104 by eyelets 108 behind the discs 105. Sufficient space is provided for minimum sized fruit to pass between the rollers 107.

Figure 9:
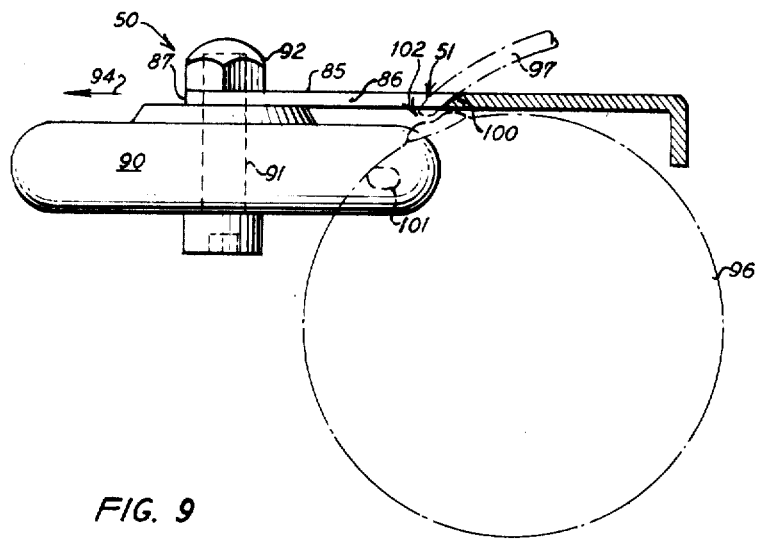
FIG. 9 is a sectional view of the attachment shown in FIG. 8A taken on lines IX—IX illustrating also a fruit member being separated from its stem.
Figure 11:
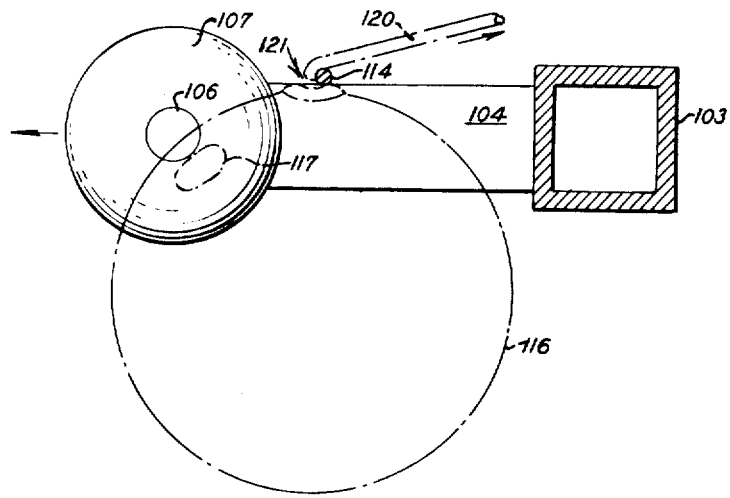
FIG. 11 is a side sectional view of the attachment shown in FIG. 10 taken on lines XI—XI of FIG. 10A.
Figure 14:
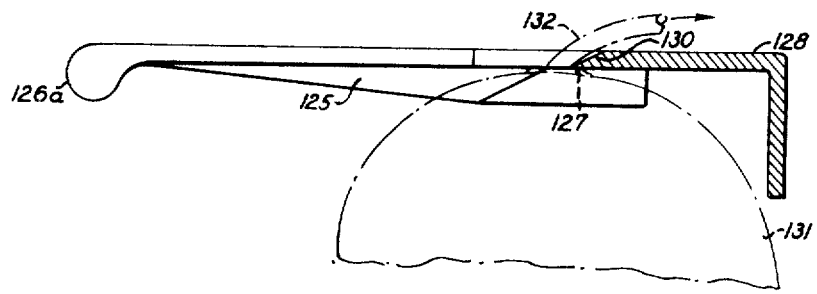
FIG. 14 is a side sectional view taken on lines XIV—XIV of FIG. 12B.

The operation of the picking attachments shown in this embodiment is similar to that shown in the embodiment in FIGS. 8A–9. The free turning rollers 107 permit movement of the branches and limbs over the picking attachment while the fruit is brought into the slots 115, where it assumes a position as shown in FIG. 11. In such position the adjacent fruit rollers 107 contact the fruit 116 at a place designated 117, so that the stem 120 is pulled against the wire 114 at the calyx 121. As in the previous modification, the distribution of forces are such that the rupture is most likely to occur in the region of the calyx 121.

The fruit picking attachment shown in FIGS. 12A, 12D, 12C, 13 and 14, is made of a flat metallic piece 128 with a rear edge bent over for rigidity and the forward portion 126a of the fingers 126 formed in a curved surface to minimize damage to the fruit and trees. The slots 124 taper back to a semicircular radius of approximately ½ inch, or as may otherwise be desired so that unripe new fruit members can pass therethrough. Fixtures 125 are attached to the bottom side of the fingers 126 so that when fruit comes into the slots 124, the fixtures 125 provide a surface for holding the fruit's axis approximately vertical. The rear edge at the slot 124 is designated as a separator 130 and may be etiher rounded or tapered as shown. In operation, when a fruit 131 is brought into the position shown in FIGS. 13 to 14, the distribution of forces about the stem 132, the separator 130, the calyx 127, the weight and mass of the fruit 131, and the fixtures 125, is such that the rupture of the stem from the fruit is most likely to occur at the calyx 127.

Figure 16A:
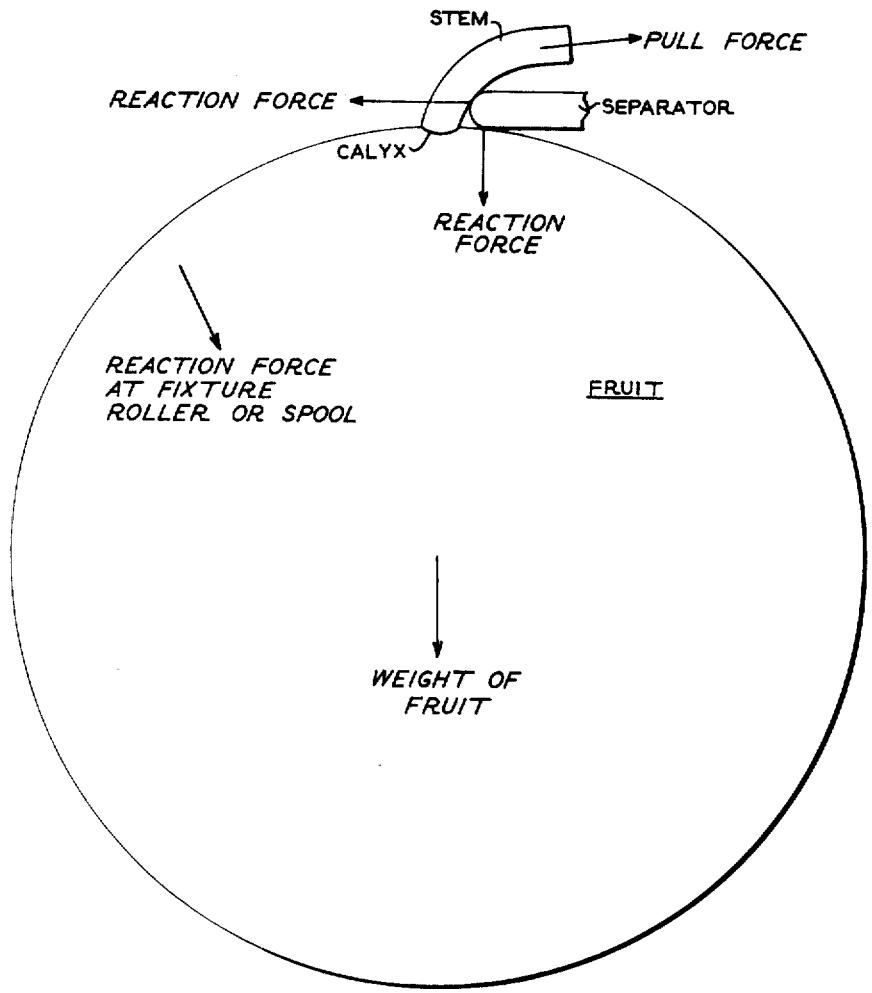
FIG. 16A illustrates the interaction of forces on a fruit when it is being separated from its stem.
Figure 16B:
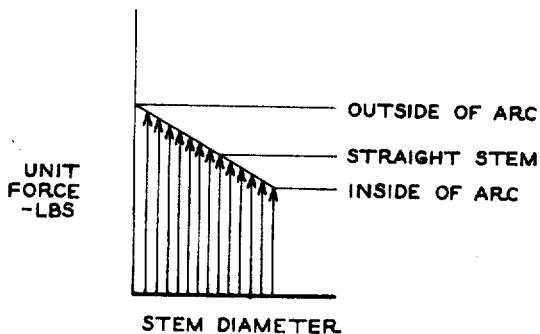
FIG. 16B is a graph of the stress on a fruit stem positioned as illustrated in FIG. 16A.

This distribution of forces may be understood best by reference to FIGS. 16A and 16B. From the diagrams, it will be noted that basically there are four separate principal forces acting on the fruit member, to wit: (1) the force pulling the stem which forces the stem and fruit against the separator and causes a moment about the separator; (2) the reacting force of the separator against the fruit and stem at the calyx; (3) the reacting force of the fixture against the fruit to deter the moment about the separator and (4) the weight of the fruit. The thickness of the separator is gauged to be less than the minimum radius that the stem can bend without causing deformation in the stem. Because of the bending of the stem over the separator, the unit tensile stress in the outer part of the stem opposite the separator is greater than the unit of pull force exerted on the straight stem, and the unit of compressive stress in the stem against the separator is less than the unit of pull force on the stem. This stress differential is passed through the calyx into the fruit because the stem is in a bend at the calyx. When the tensile stress in any part of the calyx exceeds its rupture point, the fruit and stem start to separate at the calyx. This tensile failure normally commences in the calyx opposite the separator and continues to separate in increments until the fruit and the stem are completely detached. Because it requires less force on the stem to cause this incremental parting at the calyx, as compared to direct force applied to the entire calyx simultaneously, the total force on the stem is less, thus reducing the possibility of plugging or stem breaking.

Figure 3:
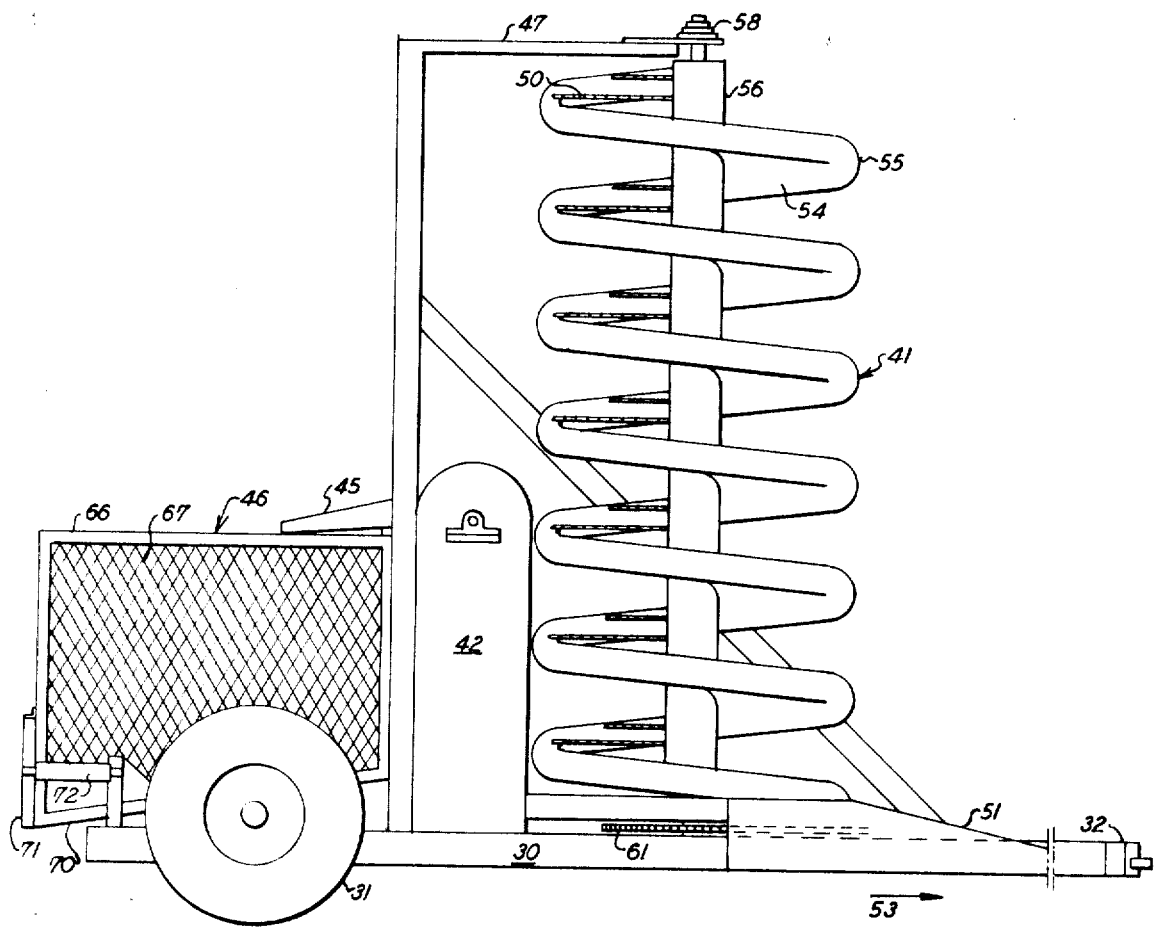
FIG. 3 is a right elevational view of the mobile fruit harvester.
Figure 4:
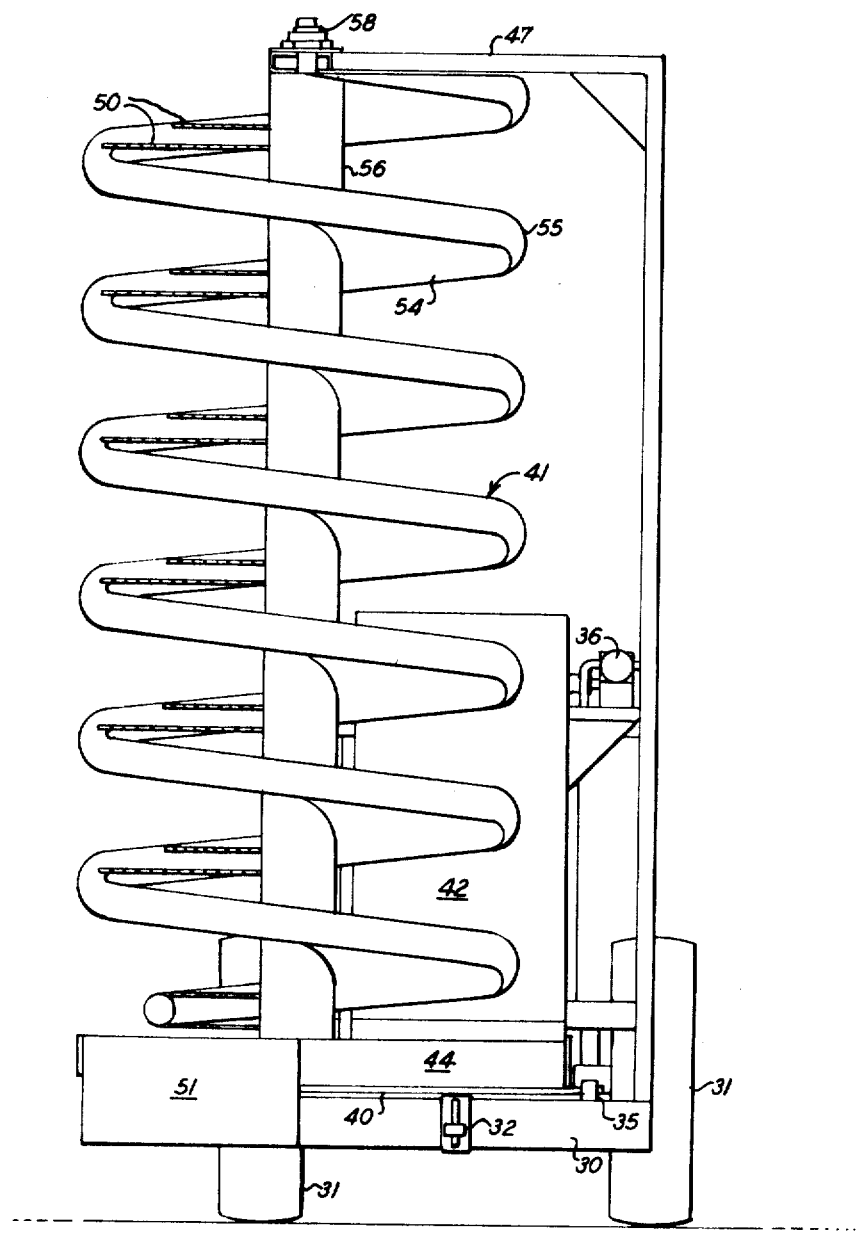
FIG. 4 is a front elevational view of the mobile fruit harvester in accordance with the invention.
Figure 5:
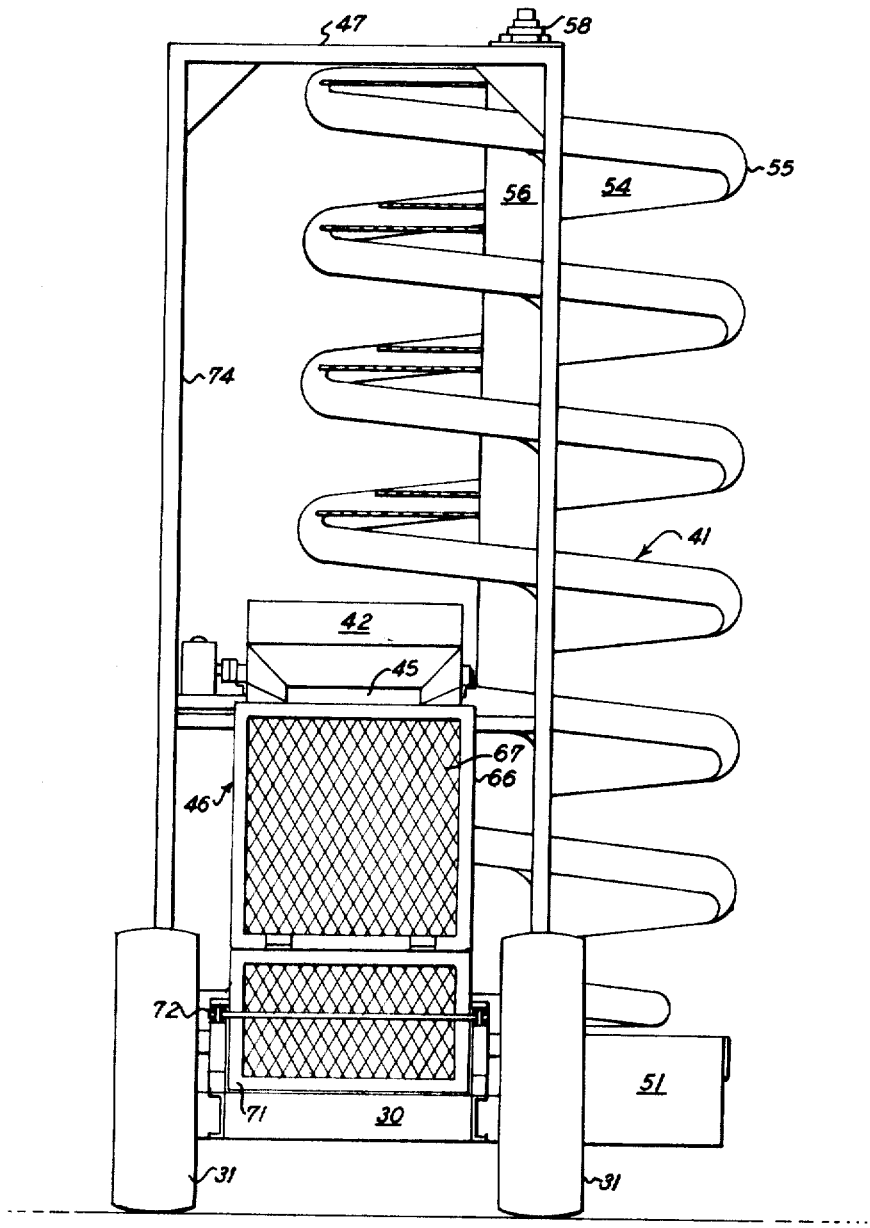
FIG. 5 is a rear elevational view of the mobile fruit harvester.
Figure 6:
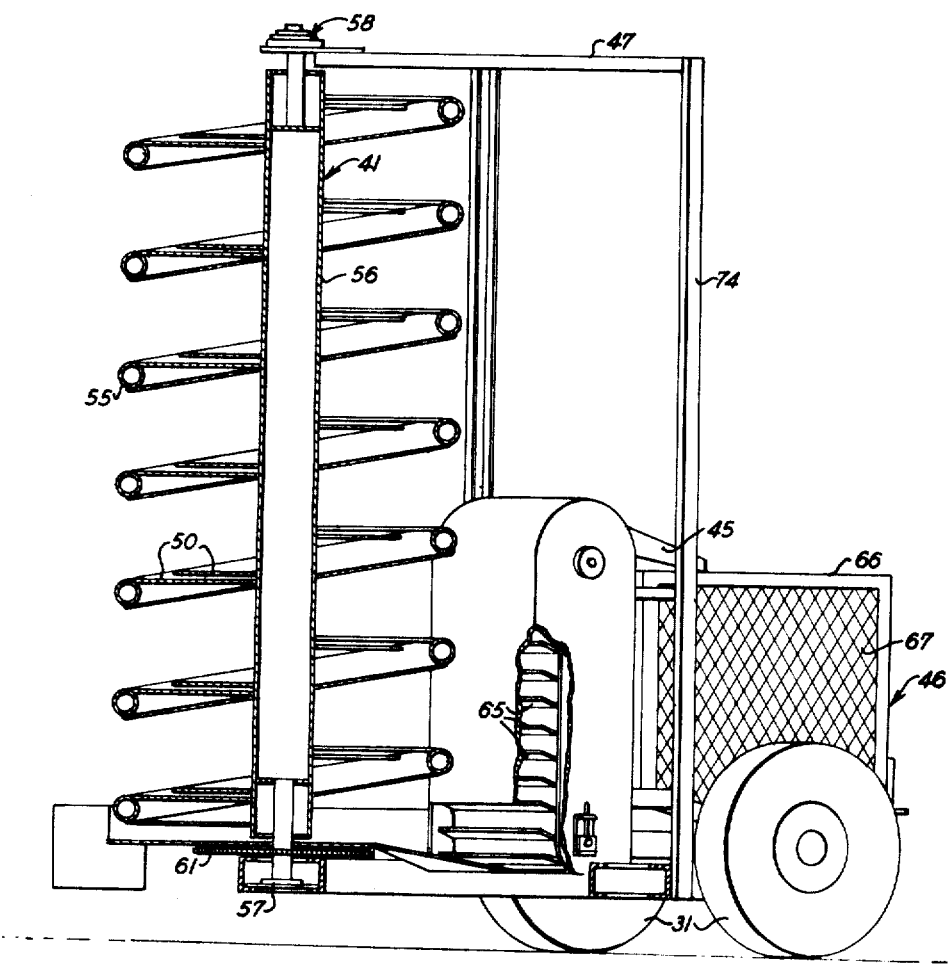
FIG. 6 is a perspective view of the mobile fruit harvester with the spiral structure shown in cross section taken on line VI—VI of FIG. 1.

In operation, the device is connected through its trailer hitch 32 to a tractor, the fruit bin 46 is in its lowered position and the rotor 41 and elevator 42 are placed in motion by their respective motors 34 and 36. The side of the rotor 41 shown in FIG. 3 is brought into position whereby it rotates through the canopy of the fruit trees. The speed of the tractor is such that the rotary member 41 will present an attachment 50 to any given locality in the tree's canopy. Thus, fruit which may be carried out of the way of a picking attachment 50 by reason of action of the limbs or interference in one rotation, may yet be drawn into the picking attachment immediately following or a picking attachment on a lower flight. As the fruit is detached, it falls onto the sheet metal bottom portion 54 of the rotor 41 and rolls down to the catch basin 44. The fruit is transported as previously described from the catch basin 44 through the elevator 42 and the discharge chute 45 into the fruit bin 46. When the fruit bin 46 is filled, it is raised, discharged and lowered, after which the picking operation may continue.

One disadvantage of the embodiment shown is that unless the canopy of the trees conforms reasonably close to a vertical plane, significant areas of the canopy are passed by. This disadvantage can be overcome to some degree by utilizing a rotor member 62 as shown in FIG. 17, wherein the upper flights 133 and 134 have a substantially increased diameter so as to reach into the upper portion of the canopy which would otherwise not be picked by the device. It will be appreciated that the upper portions comprising flights 133 and 134 may, if desired, comprise detachable attachments.

A further modification is shown in FIG. 18 wherein a rotor member 64 is mounted on an articulated arm 138 wherein the position of the rotor 64 can be controlled relative to the canopy of the tree by hydraulic cylinders 135 and 136. The articulated arm 138 is mounted on a turntable 139 on a truck bed or other suitable conveyance. A fruit bin 137 is carried below the rotary member 64 to catch fruit therefrom. A further hydraulic cylinder 140 controls the angle of the rotary member 64 relative to the articulated arm 134. In operation, a rotary member, such as shown in FIG. 18, is set at a desired position and drawn through fruit trees at successive levels so as to obtain maximum coverage of the canopy of the tree at various levels.

Figure 19:
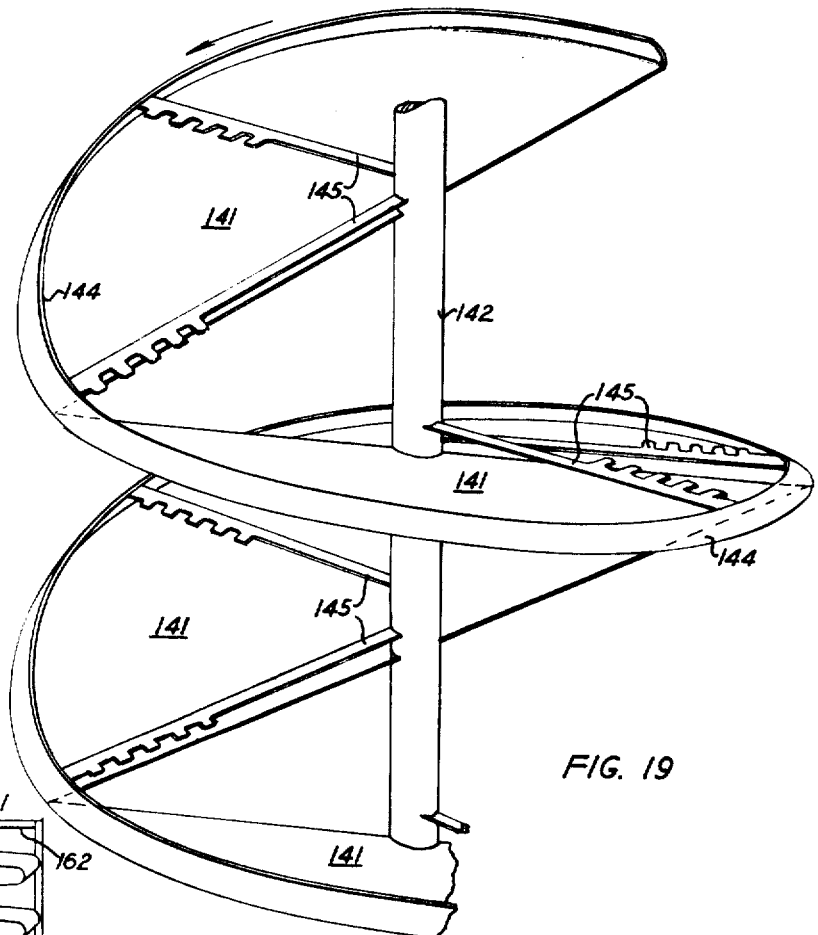
FIG. 19 illustrates a modification of the rotor wherein the spiral is formed from a plurality of semi discs.

FIG. 19 shows a modification of the spiral construction wherein a series of semi-discs 141 are inclined relative to a vertical shaft 142. A retaining rim 144 is formed with, or attached to, the semi-disc 141. Picking attachments 145 or any of the types previously discussed extend from the shaft 142 to the rim 144. The semi-discs 141 are staggered so that fruit from the picking attachments 145 rolls downwardly from one disc to another. It will be appreciated that the semi-discs 141 may be discs which are approximately one-half of a circle or any lesser part thereof. A chief advantage of this modified rotor member lies in its ease of manufacture. The picking attachments 145 may be of any type previously disclosed.

Figure 20C:
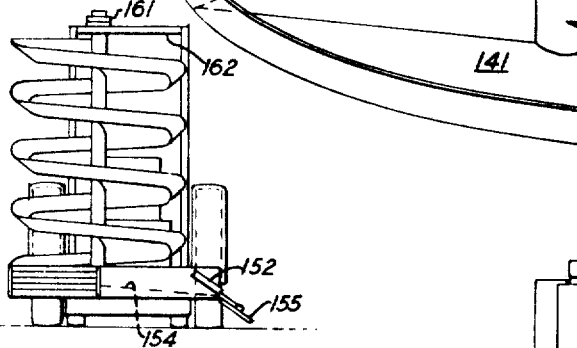
FIG. 20C is a front view of a modification shown in FIG. 20A.
Figure 20B:
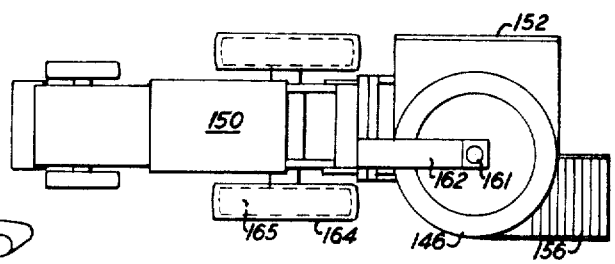
FIG. 20B is a top view of the modification shown in FIG. 20A.
Figure 20A:
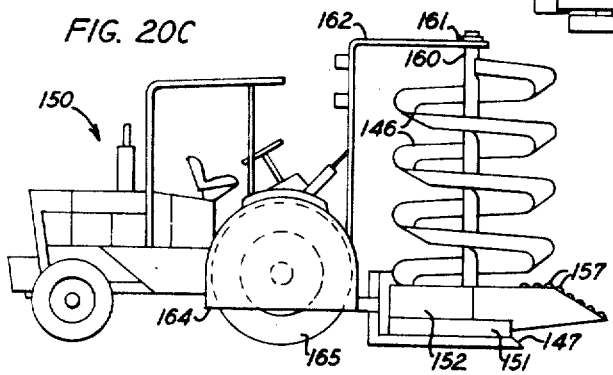
FIG. 20A illustrates a modified form of the invention wherein the harvester is mounted on an industrial forklift tractor.

FIGS. 20A, 20B and 20C disclose a helix spiral rotor 146 having picking attachments (not shown) of any type previously shown. The rotor 146 has a pitch of 2 feet. It is approximately 6 feet in diameter and 8 feet high and is mounted on the forks 147 of an industrial fork lift tractor 150. The tractor affords a mobility in an orchard or grove which is not obtainable when the rotor member is placed on a trailer. The framework 151 is bolted or otherwise firmly secured to the forks 147 and supports a bottom thrust bearing, a hydraulic motor and a suitable shaft mounted speed reducer. The hydraulic motor is powered by a hydraulic pump mounted on the tractor and driven by the tractor engine. A fruit bin 152 of approximately 20 cubic feet capacity, provides for the temporary storage of fruit. The floor 154 of the fruit bin 152 is inclined and a dump gate 155 controlled by a hydraulic cylinder permits the discharge of fruit from the fruit bin from time to time. The limb pickup ramp 156 is mounted on the framework 151 forward of the tree half of the rotor 146 to bring limbs into the rotor. Rollers 157, rotatably mounted on the ramp 156, improve movement of the limbs and fruit to the rotor. The top of the rotor shaft 160 is mounted in the top support bearing 161, which is bolted to a frame 162 projecting from the top of the lift mechanism of the tractor. A shield 164 is provided over wheel 165 so that tree limbs will not become entangled in the wheel.

In operation, the forks 147 are raised sufficiently to clear the ground obstructions, and the rotor 146 is rotated at approximately 10 revolutions per minute. The tractor is driven forward at a speed of approximately 100 feet per minute and the rotor 146 engages 2 to 3 feet of the tree canopy, picking fruit as it moves forward. Dependent upon the pattern of the trees, the trees can be circled to pick one tree completely or an entire row can be picked, manipulating the tractor to adjust to the varying contour of the trees. If the row technique is used, the perpendicular rows must also be picked in a similar fashion. After the lower level of a tree is picked, the fork lift is raised to the top level height and this level is picked in a fashion similar to that of the lower level.

When the fruit bin 152 is full, the rotor 146 is either raised or lowered so that the dump gate 155 is at the top edge of the field fruit container or service truck. The dump gate 155 is opened by hydraulic cylinders and fruit discharges into the field container. The rotor 146 is then returned to the required operating level and the picking operation is resumed.

Figure 21A:
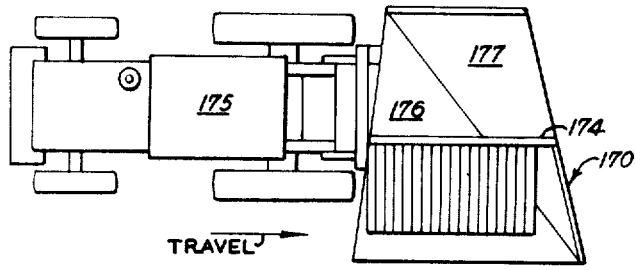
FIGS. 21A, 21B and 21C show top, side and front elevations of a still further modification of the harvester mounted on an industrial fork-lift tractor.
Figure 21C:
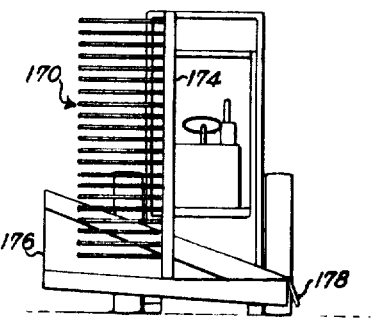
Figure 21B:
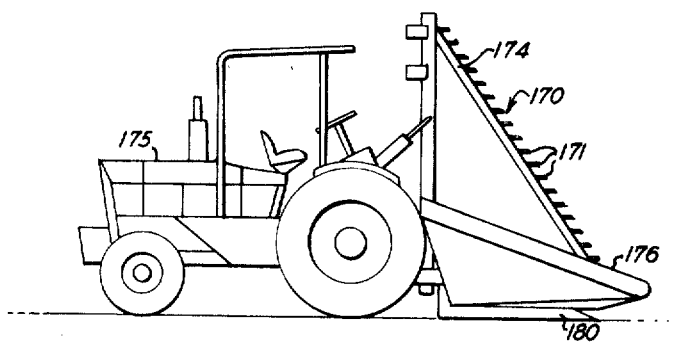
Figure 22:
FIG. 22 shows a picking attachment for the unit illustrated in FIGS. 21A, 21B and 21C.

FIGS. 21A, 21B and 21C disclose a fixed frame mobile fruit harvester designated generally by reference numeral 170, having a plurality of fruit picking attachments 171, which, as shown in FIG. 22, are similar to the attachments 50 illustrated in FIGS. 8A, 8B, 8C and 9. However, the attachments 171 each include a flange 172 by which they are rigidly connected to the slanting frame part 174 of the harvester 170. A fork lift tractor 175 detachably mounts the harvester 170 by bolts or other suitable means whereby its vertical position may be adjusted.

The operation of this unit is similar to that shown in FIGS. 20A, 20B and 20C except that the rotor 146 is replaced by the stationary frame part 174 together with the attachments 171 extending normally therefrom with each successively higher attachment 171 mounted to the rear of the lower attachment. The catch basin 176 is mounted below the frame of the picking attachments and collects picked fruit as it falls from the picking attachments. As shown, the catch basin is inclined downward to the front and left whereby the fruit gravity feeds into the fruit bin area 177 for temporary storage. The front of the catch basin 176 serves as a guide to bring lower limbs to the picking attachments 171. The dump gate 178, which may be controlled by a hydraulic cylinder as shown with reference to FIG. 20C, permits the discharge of fruit in the fruit bin from time to time.

The picking attachments 171 are shown diagrammatically by straight lines in FIGS. 21A, 21B and 21C. Although shown extending horizontally and perpendicular to the harvester's usual direction of travel, it will be appreciated that they may be biased from the horizontal or relative to the harvester's direction of travel for the purpose of conforming in an improved manner to the general disposition of the fruit bearing limbs.

In operation, the forks 180 are raised sufficiently to clear ground obstructions and the tractor 175 carries the harvester 170 forward at a speed of approximately 100 feet per minute as the picking attachments 171 engage two or three feet of the canopy. After the lower level is picked, the lift is raised and the upper level is picked.

In order to prevent injury to the trees, it is important that no sharp edges or points come into contact with the trees insofar as may be avoided. For this reason, all metal edges should be rounded and portions such as the rim portions and parts of the pickers may be coated with resilient or slippery materials to avoid limbs catching in the apparatus.

While I have described the preferred embodiments of my invention, it is to be understood that it is capable of other adaptations and modifications.

Having thus described my invention, what I claim as new and desire to secure by Letters Patent of the United States is:

1. A fruit harvester which comprises a mobile frame, a pluarality of vertically spaced substantially horizontally extending fruit picking arms extending outwardly from said frame adapted to move relatively to and to comb through a fruit bearing plant when said frame moves past said plant, and a plurality of horizontally spaced fruit stem receiving slots defined in each of said fruit picking arms, said slots being of a width to receive the stems of the fruit of said fruit bearing plant while retaining the ripened fruit thereunder for separating the ripened fruit from the fruit bearing plant.

2. A fruit harvester in accordance with claim 1, wherein said fruit picking arms are mounted on a rotor adapted to rotate through the canopy of said plant.

3. A fruit harvester in accordance with claim 1, wherein at least one of said fruit picking arms includes guide means for guiding fruit bearing limbs thereto.

4. A fruit harvester in accordance with claim 1, wherein said fruit picking arms are staggered relative to each other and wherein the fruit picking arms immediately higher than the next lower of said picking arms is also immediately in the rear of said picking arm.

5. A fruit harvester, in accordance with claim 1, wherein a catch basin is mounted below the fruit picking arms whereby picked fruit can be temporarily stored.

6. A catch basin, in accordance with claim 5, wherein said catch basin is attached to a lift means for selectively lifting said catch basin.

7. A fruit harvester which comprises a mobile frame a vertical rotatable means mounted on said frame, a plurality of vertically spaced substantially horizontally extending fruit picking arms extending outwardly from said rotatable means whereby when said rotatable means rotates said fruit picking arms move transversely relative to and through a fruit picking plant, and a plurality of horizontally spaced fruit catching means in each of said fruit picking arms, said catching means each including a fruit stem receiving slot of a width to receive the stems of the fruit of said fruit bearing plant and hold said fruit thereunder as said fruit is removed from said fruit bearing plant.

8. A fruit harvester in accordance with claim 7, including fruit conveynig means associated with said fruit picking arms, whereby fruit removed by said fruit picking means from said fruit bearing plant are conveyed therefrom by said fruit conveying means.

9. A fruit harvester in accordance with claim 8, including a receptacle means carried on said frame and cooperating with said fruit conveying means to receive fruit conveyed thereby from said fruit picking arms.

10. A fruit harvester in accordance with claim 8, wherein said fruit conveying means underlies said fruit picking arms and comprises a spiral chute.

11. A fruit harvester in accordance with claim 8, wherein said fruit picking arms and said fruit conveying means extend outwardly to conform to the contour of a fruit tree.

12. A fruit harvester in accordance with claim 8, including a catch basin mounted on said frame beneath said rotatable means cooperating with said conveying means to receive fruit conveyed thereby from said fruit picking arms.

13. A fruit harvester in accordance with claim 8, including a receptacle means carried on said frame cooperating with said fruit conveying means to receive fruit therefrom for temporary storage.

14. A receptacle in accordance with claim 13, wherein said frame includes lifting means for selectively lifting said receptacle.

15. A fruit harvesting means in accordance with claim 7, wherein said rotatable means is mounted on an articulated arm and turntable, said turntable being rotatably mounted on mobile means, whereby said rotatable means can be manipulated in the canopy of the fruit tree.

16. A fruit picking attachment which comprises supporting means, a plurality of projection means extending forwardly from said supporting means, said projection means defining a plurality of slots of sufficient width to receive stems of fruit intended for picking therein, a non-cutting separating means disposed transversely to and substantially across said slots, and holding means mounted on and spaced below said projection means adapted to hold the stem of said fruit substantially perpendicular to said separating means for separating the stem from the fruit without severing the stem thereof, whereby when said attachment is moved through a fruit bearing plant the fruits are separated from their stems by being held in said slot by said holding means while said stem is parted from said fruit at its calyx by being bent over said separating means.

17. A mechanism in accordance with claim 16 comprising a mobile frame upon which are mounted a plurality of said attachments.

18. A mechanism in accordance with claim 17 wherein said attachments are staggered upwardly and to the rear relative to the normal direction of travel of said frame.

19. A mechanism in accordance with claim 18 wherein said attachments extend approximately perpendicular relative to the normal direction of travel of said frame.

20. A mechanism in accordance with claim 17 including selective lifting means associated with said frame for lifting said plurality of attachments.

21. A mechanism for picking fruit which comprises a pair of forwardly extending projections defining therebetween a slot which is sufficiently wide to receive the stems of said fruit and sufficiently narrow to prevent the passage of said fruit therethrough, a non-cutting separating member disposed transversely to and substantially across said slot, holding means mounted on and spaced below each of said projections forwardly of said separating member adapted to hold said fruit substantially perpendicularly to said separating member when said stem moves rearwardly relative to said projections for separating the stem from the fruit without severing the stem thereof, whereby the calyx of said fruit so held is approximately adjacent said separating member, said separating member constituting a fulcrum, whereby by pulling said stem said calyx is ruptured and said fruit is freed from its stem at said calyx.

22. A mechanism in accordance with claim 21, wherein said holding means comprises rotatable members.

23. A mechanism in accordance with claim 22, wherein said rotatable members are rotatable about an axis generally perpendicular to said projections.

24. A mechanism in accordance with claim 22, wherein said rotatable members are rotatable about an axis generally parallel to a plane which includes said slot.

25. A mechanism in accordance with claim 21, wherein said separating member comprises an end portion joining and integral with said projections.

26. A mechanism in accordance with claim 21, wherein said separating member comprises a wire disposed across said slot.

27. A mechanism in accordance with claim 21, wherein said holding means are composed of a pliant material.

28. A mechanism in accordance with claim 21, including means for rotating the mechanism horizontally through the canopy of a plant bearing said fruit.

29. A fruit harvester which comprises a mobile frame, a vertical rotatable means mounted on said frame, a plurality of fruit picking means extending outwardly from said rotatable means whereby when said rotatable means rotate said fruit picking means moves through a fruit bearing plant and said fruit are removed therefrom, and fruit conveying means underlying said fruit picking means comprising staggered inclined radial segments with joined arc-shaped peripheries whereby said peripheries substantially form a helix spiral.

30. A fruit harvester which comprises a mobile frame, a vertical rotatable means mounted on said frame, a plurality of fruit picking means extending outwardly from said rotatable means whereby when said rotatable means rotate said fruit picking means moves through a fruit bearing plant and said fruit are removed therefrom, said fruit picking means including bar means with a plurality of slots thereon, said slots being a sufficient width to receive the stems of said fruit whereby matured fruit will not pass through said slots, and rollers associated with said slots, whereby fruit within said slots is held substantially perpendicularly when said stem is pulled by movement of said fruit picking means.

31. A fruit harvester which comprises a mobile frame, a vertical rotatable means mounted on said frame, a plurality of fruit picking means extending outwardly from said rotatable means whereby when said rotatable means rotates said fruit picking means moves through a fruit bearing plant and said fruit are removed therefrom, said fruit picking means including bar means with a plurality of slots therealong, said slots being a sufficient width to receive the stems of said fruit whereby the matured fruit will not pass through said slots, separating means in said slots adapted to separate the fruit and the stem at the calyx of the fruit.

References Cited

UNITED STATES PATENTS

| | | | |
|---|---|---|---|
| 1,225,097 | 5/1917 | Young | 56—339 |
| 1,588,034 | 6/1926 | Koehler | 56—339 |
| 2,900,780 | 8/1959 | Kaiser | 56—339 |
| 2,953,229 | 9/1960 | Wiegel | 56—328 |
| 2,953,889 | 9/1960 | Lindsay | 56—50 |
| 3,023,565 | 3/1962 | McKibben et al. | 56—330 |
| 3,077,720 | 2/1963 | Grove et al. | 56—328 |
| 3,081,591 | 3/1963 | Coe | 56—339 |
| 3,169,359 | 2/1965 | Nickla et al. | 56—44 |
| 3,245,211 | 4/1966 | Weygandt et al. | 56—330 |
| 424,271 | 3/1890 | Chapman | 56—328 UX |
| 3,087,296 | 4/1963 | Cowles | 56—25.4 |
| 3,410,068 | 11/1968 | Recker | 56—332 |

FOREIGN PATENTS

| | | | |
|---|---|---|---|
| 1,034,555 | 6/1966 | Great Britain | 56—328 |

LOUIS G. MANCENE, Primary Examiner

J. A. OLIFF, Assistant Examiner

U.S. Cl. X.R.

56—328